Patented July 6, 1926.

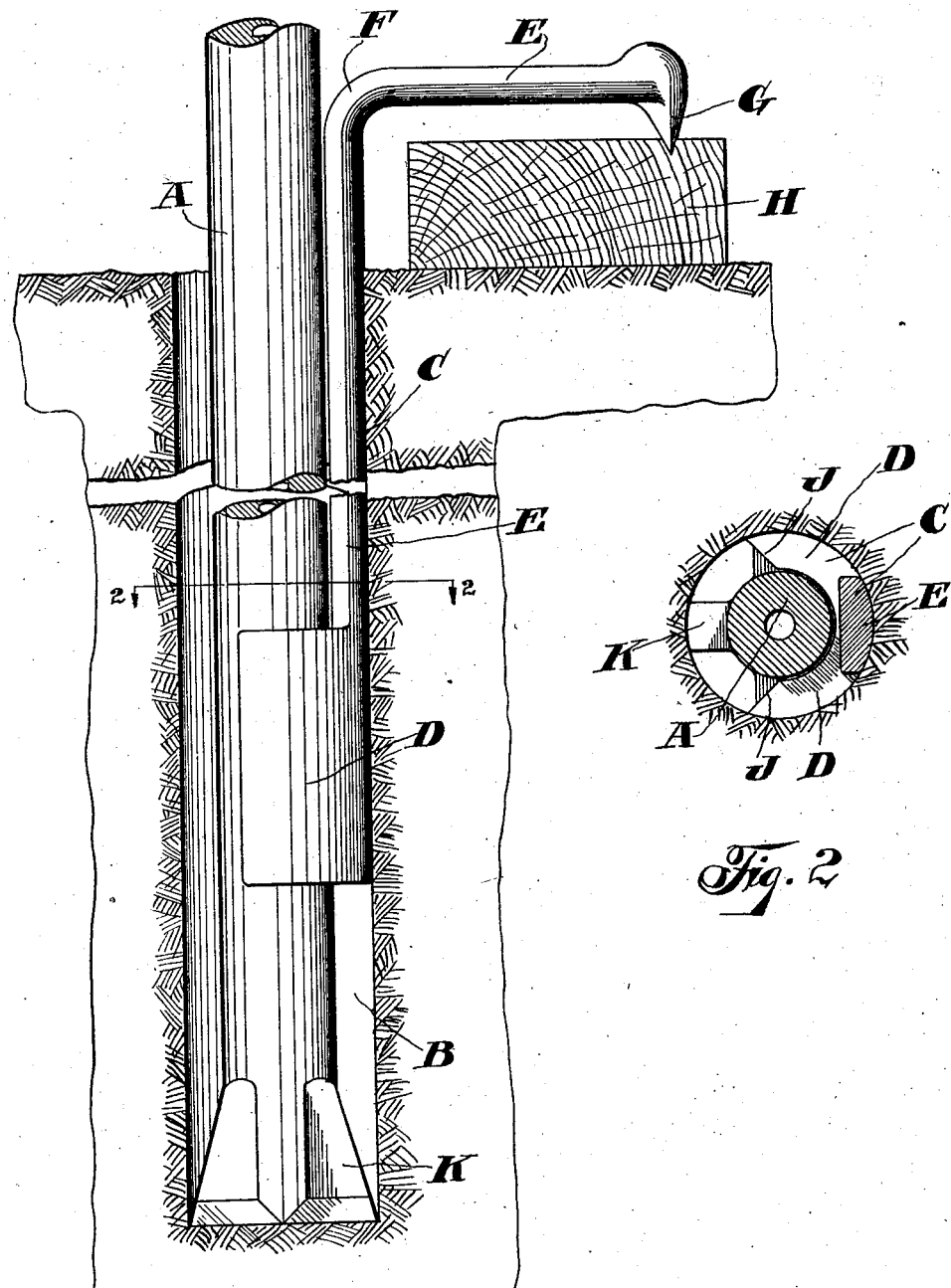

1,591,376

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

HOLE GUIDE FOR DRILL STEELS.

Application filed October 5, 1925. Serial No. 60,402.

This invention relates to rock drills but more particularly to a device for guiding a rock drill within the drill hole. The operator of a percussive rock drill has to be continually on the watch to prevent his steel from rifling the drill hole and sticking especially, if he is drilling in brecciated ground or if the rock itself is of an uneven character and hardness. Also in drilling deep horizontal holes it is very hard to maintain alignment between the drill steel and the drill, due to the loose fit in the drill chuck and the fact that the diameter of the drill hole in the first two feet may be two inches greater than the diameter of the drill hole at a depth of eighteen or twenty feet, with the result that a long steel receives no support from the walls of the hole where the support is most needed and bends between the end of the hole and the drill chuck. In this case the operator is often tempted to secure alignment by changing the position of the drill itself with the result that he quickly rifles his hole when drilling is resumed.

The object of this invention is to overcome these difficulties by providing a cheap, practical guide for the drill steel which will hold the steel concentric with the bore of the hole and prevent rifling and the resultant sticking of the steel, or if used as a remedy instead of a preventative after a steel has become stuck will help to loosen it and will guide it back into its proper course.

At the same time, it does not close up the hole and thus prevent the escape of the water and cuttings.

My invention consists of the elements set forth in the appended claims, described in the specification and illustrated in the accompanying drawings in which, Figure 1 is a horizontal sectional view of a drill hole containing a drill steel and the drill steel guide in position, and Figure 2 is a cross-sectional view of the same along the line 2—2 in Figure 1 looking in the direction of the arrows.

Referring to the drawings a drill steel A is in position to drill in a hole B. The steel and the hole may be of any depth, preferably however of a depth greater than two feet and up to thirty feet for instance. With the drill steel A has been inserted the steel guide C. This is preferably an iron or steel forging in this instance consisting of three main portions:—a semi-cylindrical guide piece or head D partly encircling the drill steel A, and having a loose fit therewith, and holding the steel A concentric with the bore of the hole B. To this head D is attached the arm E preferably a bar thin enough to fit loosely between the bore of the hole and the drill steel. This bar or arm is bent preferably at right angles at F and a point or spike is formed at G for engagement with a block of wood H. By the use of wooden blocks the said guide head can be either lowered or raised with relation to the drilling bit K on the steel A.

In operation the guiding head D should be six or eight inches from the bit, and several guides of different lengths should be provided for drilling a deep hole.

I am not to be understood as limiting my steel guide to the exact form disclosed in the drawings, particularly in the matter of means for suspending the guide piece in the hole. Obviously in horizontal or up-drilling the spike G could not be used and some form of handle or flat plate would be preferable. Also, in the matter of cross-sectional shape of the guide head D as shown in Figure 2, the preferable form has the beveled edges J which give the guide head more support from the bore of the hole while at the same time the guide does not bind or hold the drill steel. Other variations may be possible under special circumstances.

I claim:

Means for guiding a rock drill steel in drilling operations consisting of a semi-cylindrical head or guide adapted to fit loosely around the drill steel, a rod integral with said guide and adapted to fit loosely between the said drill steel and the bore of the hole, and a point or spike on the end of the rod opposite to the guide, said spike being adapted to engage with a block or plank for suspending the device at a predetermined depth in the drill hole and for holding the said device against rotation.

In testimony whereof I have signed this specification.

CHARLES C. HANSEN.